Oct. 22, 1968  R. M. NELDEN  3,406,518
FLUID DRIVE CENTRIFUGAL VALVE CONTROL MEANS
Filed Oct. 19, 1966  3 Sheets-Sheet 1

INVENTOR
RICHARD M. NELDEN
BY WILSON, SETTLE, BATCHELDER & CRAIG
ATTORNEYS

Oct. 22, 1968    R. M. NELDEN    3,406,518
FLUID DRIVE CENTRIFUGAL VALVE CONTROL MEANS
Filed Oct. 19, 1966    3 Sheets-Sheet 2
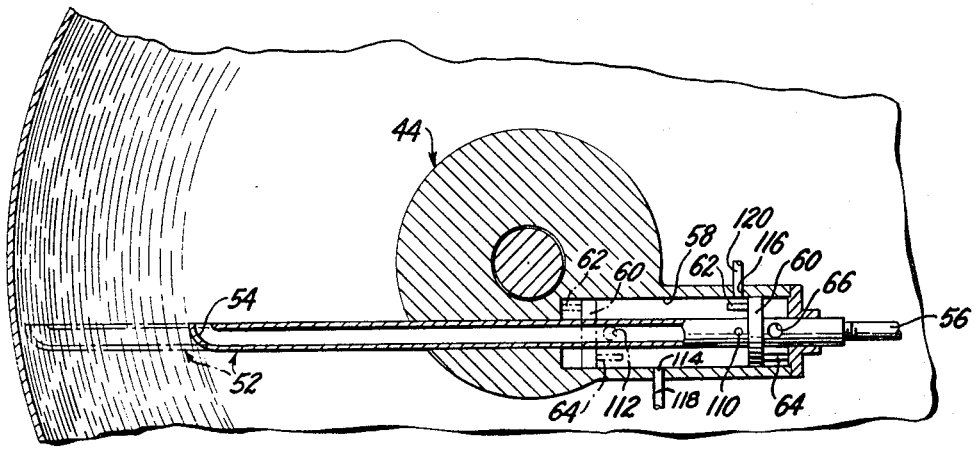
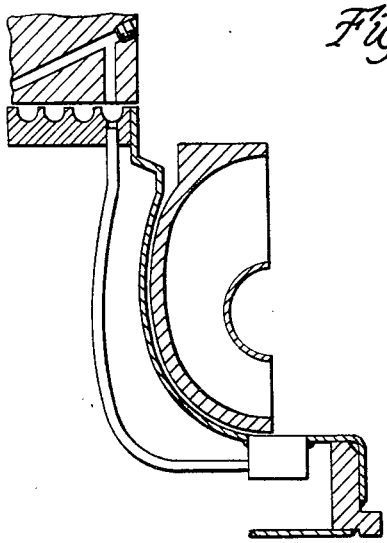
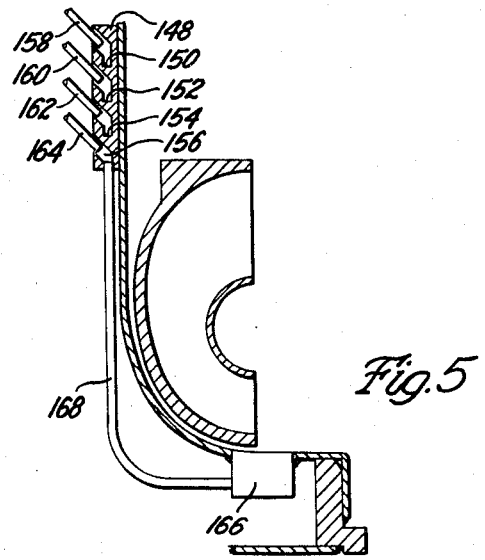
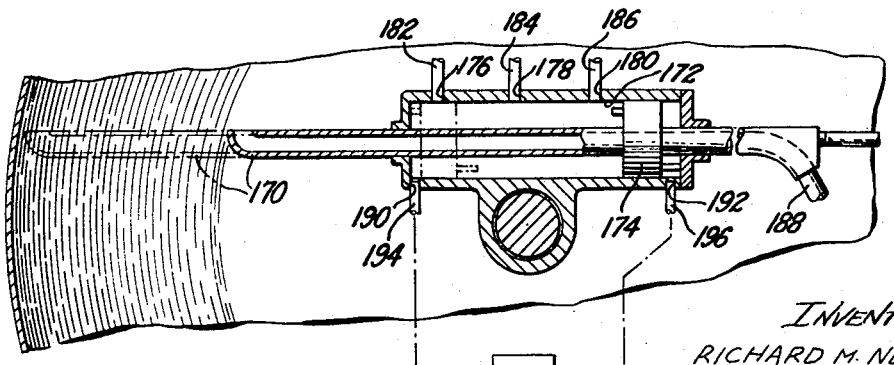
INVENTOR
RICHARD M. NELDEN
WILSON, SETTLE, BATCHELDER & CRAIG
ATTORNEYS Oct. 22, 1968   R. M. NELDEN   3,406,518
FLUID DRIVE CENTRIFUGAL VALVE CONTROL MEANS
Filed Oct. 19, 1966   3 Sheets-Sheet 3

INVENTOR
BY RICHARD M. NELDEN
WILSON, SETTLE, BATCHELDER & CRAIG
ATTORNEYS

United States Patent Office 3,406,518
Patented Oct. 22, 1968

3,406,518
FLUID DRIVE CENTRIFUGAL VALVE CONTROL MEANS
Richard M. Nelden, Southfield, Mich., assignor to American Standard Inc., a corporation of Delaware
Filed Oct. 19, 1966, Ser. No. 587,722
9 Claims. (Cl. 60—54)

ABSTRACT OF THE DISCLOSURE

A fluid coupling of the type comprising impeller and runner elements defining a working circuit in which provision is made for varying the degree of filling of the working circuit to vary the torque-transmitting capability of the coupling and therewith the slip in the coupling, and in which during operation of the coupling there is flow of working liquid from the working circuit through restricted ports.

---

In the form of coupling with which the present invention is concerned, liquid flows from the working circuit through the restricted ports to a rotatable reservoir chamber in which is provided an adjustable scoop tube that serves to return liquid from the reservoir chamber via a cooler back to the working circuit. The position of the scoop tube determines the degree of filling of the working circuit.

In such couplings, the rate of flow of liquid from the working circuit through the restricted ports varies at any given coupling speed in accordance with the pressure acting on the liquid. The pressure acting on the liquid is dependent upon the quantity of liquid in the working circuit. When this quantity is high, as when the working circuit is full, the pressure therein is high and there is a higher rate of flow through the restricted ports than there is when the quantity of liquid is lower, as when the working circuit is substantially or partly empty.

The circulation of liquid between the working circuit and the reservoir chamber therefore increases when the filling of the working circuit is increased and it decreases when the filling is decreased. This is the opposite of what is desired for the purpose of cooling the working liquid because when driving a load having a constant torque characteristic more heat is generated when the working circuit is only partly full than when the working circuit is full because of the much higher slip in the partly filled working circuit.

According to the present invention, means are provided to restrict flow from the working circuit when the quantity of liquid therein is high and to increase flow from the working circuit when the quantity of liquid therein is low. Another feature of the present invention is that the liquid control means results in an extremely fast response when clutching or declutching the fluid drive. That is, when the fluid drive is being clutched, the restriction to flow from the working circuit increases, thus resulting in rapid filling of the working circuit. Conversely, when the fluid drive is being declutched, liquid flows more rapidly from the working circuit thus emptying the working circuit quickly.

It is therefore an object of the present invention to provide, in fluid coupling, adjustable restrictions between the working circuit and rotatable reservoir chamber to cause an increase in flow from the working circuit through the rotatable reservoir as the amount of liquid in the working circuit is decreased.

Another object of the invention is to provide control means which sequentially open a plurality of valves controlling flow from the working circuit to the rotatable reservoir to sequentially increase liquid flow from the working circuit to the rotatable reservoir as the amount of liquid in the working circuit is decreased.

A further object of the invention is to provide control means actuated by movement of a scoop tube for operation of the valves controlling flow from the working circuit.

Another object of the invention is to provide means for adjustment of the opening and closing sequence of the valves while the fluid drive is in operation, thus eliminating the need of pre-setting the valves or shuttting the unit down in order to make adjustments.

Other objects of this invention will appear in the following description and appended claims, reference being had to the accompanying drawings froming a part of this specification wherein like reference characters designate corresponding parts in the several views.

In the drawings:

FIGURE 2 is a partial sectional view taken substantially along the line 2—2 of FIGURE 1 looking in the direction of the arrows;

FIGURE 3 is an enlarged view of the control means between the scoop mechanism and working circuit valve illustrated in FIGURE 1;

FIGURE 5 is a view similar to FIGURE 3 illustrating an alternate embodiment of the control means;

FIGURE 6 is a view similar to FIGURE 2 illustrating an alternate embodiment of the scoop tube control structure;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
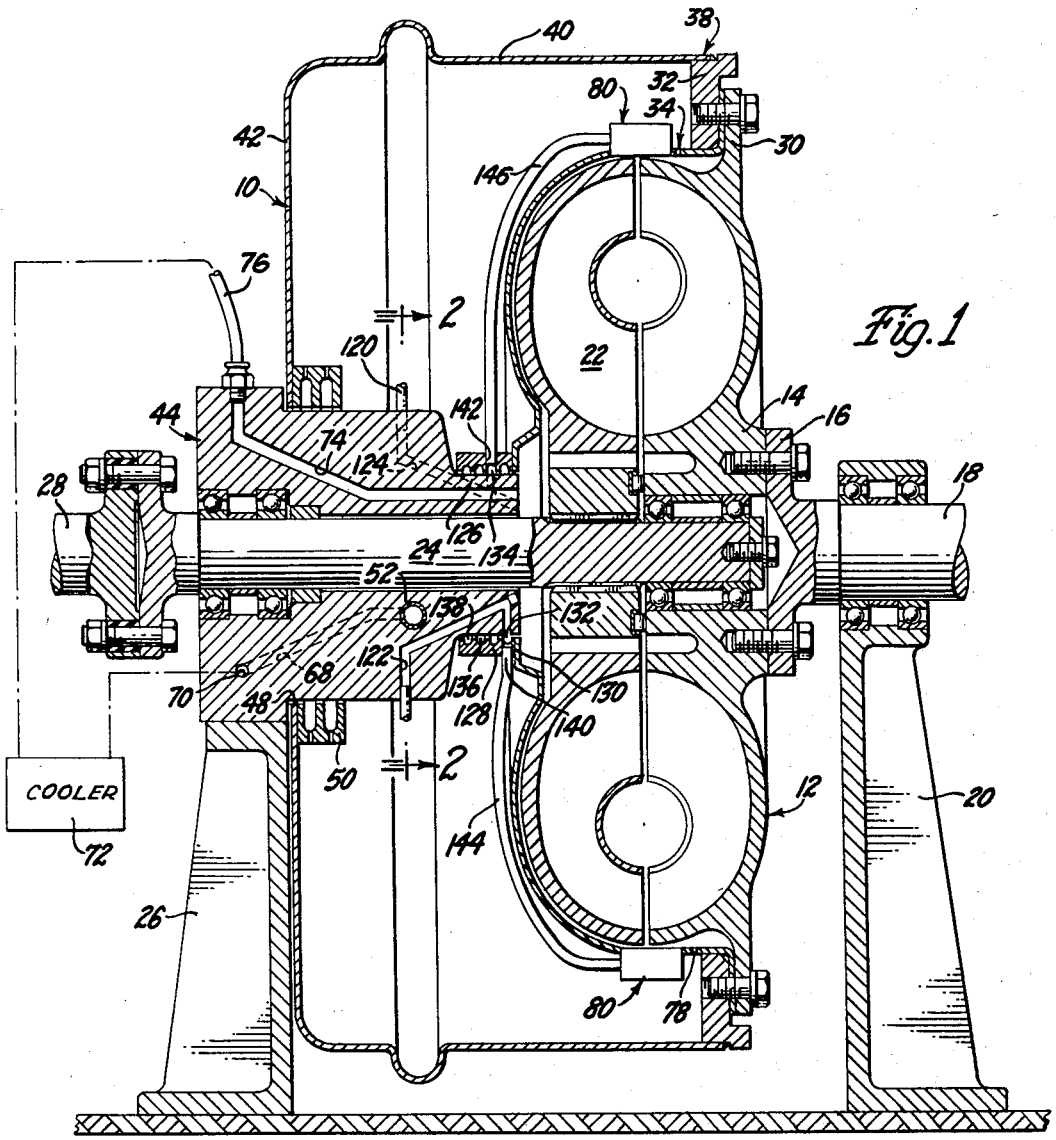
FIGURE 1 is a side elevational view in section of a fluid coupling forming one embodiment of the present invention.

Referring to FIGURES 1 and 2, the fluid coupling 10 comprises a vaned impeller 12 having a hub 14 which is bolted to the hub 16 of an input shaft 18. The input shaft 18 is suitably journalled in support structure 20.

A vaned runner 22 is mounted closely adjacent to the vaned impeller 12. The runner 22 is keyed to an output shaft 24 which is suitably journalled in a scoop manifold 44 mounted in a support structure 26. The output shaft 24 is bolted to driven element 28.

The impeller 12 has a peripheral flange 30. The flange 30 is bolted to a ring 32. A dished shell 34 having an annular flange 36 is secured between the flange 30 and ring 32. The shell 34 encloses the runner 22 with a small clearance therebetween. The shell 34, along with the impeller 12 and runner 22, define the working circuit of the fluid coupling.

A cup-shaped casing 38 forms a rotatable liquid reservoir chamber, hereinafter referred to as the scoop chamber. The casing 38 includes a cylindrical wall 40 the outer lip of which is secured to the outer surface of the ring 32 as by welding. The casing 38 is completed by circular end wall 42.

The output shaft 24 extends through an opening provided in the scoop manifold 44. The scoop manifold 44 extends through a central opening 48 in the end wall 42 of the casing 38. A labyrinth seal 50 is provided to seal this opening.

The scoop manifold 44 slidingly receives a scoop tube 52. The scoop tube 52 has an opening 54 at its outermost end for drawing liquid from the scoop chamber. A control rod 56 is connected to a scoop tube actuating mechanism (not shown) which is operable externally of the casing 38 for movement of the scoop tube towards or away from the cylindrical wall 40 of casing 38. Positioning of the scoop tube may be accomplished by either manual or automatic means as is conventional.

As shown in FIGURE 2, the scoop manifold has an elongated valve chamber 58 through which the scoop tube extends. The scoop tube carries a piston-like valve element 60. The element 60 has stops 62, 64 to limit its movement within the chamber 58. The scoop tube has an outlet opening 66 on the rearward side of the element 60 for exhausting fluid from the scoop tube. As will be noted in FIGURE 1, a passageway 68 in the manifold 44 extends from the rearward portion of chamber 58. The passageway 68 connects with a passageway 70 which extends to the periphery of the manifold 44 and to which is connected a conduit (not shown) for exhausting liquid to a cooler 72 in the direction of the arrows. Liquid is moved from the cooler back to the working circuit. As will be noted, a passageway 74 is provided in the scoop manifold 44 in communication with the working circuit of the coupling. A conduit 76 leads from the passageway 74 to the cooler 72. Liquid thus flows from the scoop chamber through the scoop tube 52 thence through passageway 68 to the cooler 72 and from the cooler through conduit 76, thence to passageway 74 into the working circuit.

Operation of the fluid coupling is conventional. The working circuit is supplied with liquid such as oil, and the input shaft 18 is driven. Rotation of the impeller 12 causes rotation of the liquid with subsequent rotation of the runner 22. The runner 22 turns the output shaft 24 which drives the element 28. A plurality of exhaust restrictions 78 are provided in circumferentially spaced apart relationship in the shell 34. The restricted ports 78 result in normal continuous flow of liquid from the working circuit into the scoop chamber for ultimate discharge to the cooler 72.

Additional valve-controlled restrictions 80 are provided in the shell 34 for permitting additional flow of liquid from the working circuit at times when the amount of liquid in the working circuit is decreased from normal full load.

Figure 4:
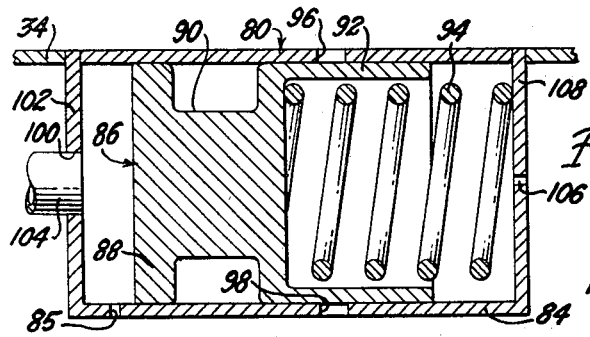
FIGURE 4 is a sectional view of the working circuit valve of FIGURE 1.

The restrictions 80 are illustratively four in number and are provided in spaced apart relationship around the shell 34. As shown in FIGURE 4, each restriction 80 includes a valve casing 84. A valve element 86 is slidably received within each casing 84. The valve element 86 comprises a first enlarged portion 88 which is in piston-like contact with the interior walls of the casing. A reduced portion 90 extends from portion 88. A cup-shaped portion 92 completes the valve element. The portion 92 is also in piston-like contact with the interior walls of the casing 84. A coil spring 94 is received within portion 92. The spring 94 biases the valve element towards the right as viewed in FIGURE 4. A port 96 is provided in one wall of the casing for communication with the interior of the working circuit of the fluid coupling. A second port 98 is provided in the casing wall diametrically opposite support port 96. When the valve element 86 is in its normal position as illustrated in FIGURE 4, the ports 96, 98 are closed by portion 92. A third port 100 is provided in the end wall 102 of the valve casing. A conduit 104 extends from the port 100 to a source of control liquid as will hereinafter be more fully described. When liquid under pressure is injected through port 100, the valve element 86 is moved against the action of spring 94 to place the reduced portion 90 in line with ports 96, 98. Liquid can then flow through these ports to discharge liquid from the working circuit of the fluid coupling. A small vent opening 106 is provided in the outermost wall portion of the casing 84 to permit movement of the valve element 86 to the left as viewed in FIGURE 4. A similar vent opening 85 is provided in the opposite end of the casing. Valve designs other than the one shown may be employed.

The means for supplying liquid under pressure to the valves 80 may best be seen in FIGURES 1, 2 and 3. As will be appreciated, when the scoop tube 52 is moved from the dotted line position illustrated in FIGURE 2 to the illustrated full line position, the amount of liquid retained in the scoop chamber is increased, thus reducing the amount of liquid available for the working circuit of the fluid drive. Movement of the scoop tube towards the full line position thus serves to declutch the fluid drive. It is at this time that it is desired to circulate liquid through the fluid drive at a more rapid rate because as the fluid drive is declutched, there is increased slippage with resultant higher friction and greater heating of the liquid in the working circuit. Additionally, during the declutching operation, it is desirable to empty the working circuit as quickly as possible and therefore discharge means in addition to the normal restricted openings from the working circuit to the scoop chamber are desirable.

It will be noted in FIGURE 2 that a small discharge opening 110 is provided in the scoop tube on the forward side of the element 60. Liquid which enters the scoop tube will thus be discharged through the opening 110 into the chamber 58, filling the portion of the chamber forward of the element 60 as the scoop tube is moved to the right as viewed in FIGURE 2.

A plurality of discharge ports are provided in the side wall of the chamber 58, a discharge port being provided for each of the valves 80. Three ports 112, 114, 116 are visible in FIGURE 2. The fourth port corresponding to the fourth valve 80 is not visible in the FIGURE 2 section. It will be noted that the ports are spaced longitudinally along the chamber 58. This arrangement results in sequentially opening the valves 80. Sequential opening of the valves is desirable because liquid flow through the working circuit of the fluid coupling is thus increased in steps. Liquid flow through the working circuit is thus greatest when the amount of liquid in the working circiut is at a minimum. Conversely, liquid flow through the working circuit is at a minimum when the amount of fluid in the working circuit is at a maximum. This results in lower circulation losses and improved overall efficiency.

It will be noted that the ports 112, 114, 116 are not only spaced longitudinally with respect to each other but are also spaced around the periphery of the piston chamber. The reason for this is to facilitate running conduit from these ports into connection with ports in the scoop manifold 44. A conduit leads from each of the ports in the piston chamber to a port in the scoop manifold. FIGURE 2 illustrates a conduit 118 leading from port 114 and a conduit 120 leading from port 116. As shown in FIGURE 1, these conduits are connected to passageways 122, 124 in the scoop manifold 44. The passageways 122, 124 lead to the hub portion 126 of the scoop manifold which is closely adjacent to the shell 34. A ring 128 is secured to flange 130 of the shell 34 and rotates therewith. The interior surface of the ring 128 is closely adjacent to the exterior surface of the scoop manifold hub 126. The ring 128 has four annular grooves 132, 134, 136, 138 each of which is in line with the discharge end of one of the passageways in the scoop manifold. For example, the groove 132 is in line with the passageway 122 and the groove 134 is in line with the passageway 124.

A port is provided in the ring 128 for each of the grooves for discharge of liquid from the grooves. For example, as shown in FIGURE 1, a port 140 is provided for the groove 132 and a port 142 is provided for the groove 134. A conduit extends from each of these ports to one of the valves 80. For example, conduits 144, 146 extend from ports 140, 142 to their respective valves.

Operation of the pistons may now be readily understood. As the scoop tube 52 is moved toward the right as viewed in FIGURE 2, liquid will fill the forward portion of chamber 58. This liquid is at an elevated pressure as a result of the centrifugal pressure of the rotating liquid ring from which it is taken. The liquid will thus move through the ports in the chamber 58 as these ports are sequentially uncovered by the element 60. The liquid moves from the chamber 58 through the scoop manifold 44 and discharges into the ring 128. Liquid moves from the ring 128 as a result of centrifugal action to the valves 80. As discussed in connection with FIGURE 4, when pressurized liquid enters the valves 80 through ports 100, it causes the valve elements 86 to move and open the ports 96, 98. Liquid will then be drained from the working circuit of the fluid coupling at an increased rate. As previously mentioned, the valves 80 will be sequentially opened. However, the valves do not necessarily have to be opened sequentially, and may be opened all at the same time if desired. It should be noted that the ring 128 is positioned well inwardly towards the center of the impeller 12 and runner 22. This results in the liquid head at the ring being considerably higher than the liquid head at the periphery of the working circuit of the fluid coupling to thus assist in the opening of the valves 80.

An alternate embodiment of the grooved ring is illustrated in FIGURE 5. In FIGURE 5, the ring 148 is in the form of a disc rather than in the form of a cylinder. Grooves 150, 152, 154, 156 are provided in the exterior side face of the ring 148 rather than in the interior periphery. Conduits 158, 160, 162, 164 lead to the grooves from the scoop manifold which operates in the manner described in connection with FIGURES 1–4. It will be noted again that the grooves of the ring 148 are all positioned well inwardly of the fluid in the working circuit to provide the desired liquid head for actuation of the valve 166. The valve 166 is of the same type as described in connection with FIGURE 4. Conduits, illustratively conduit 168, connect the grooves with the valves.

An alternative embodiment of the scoop tube valve construction is illustrated in FIGURE 6. As will be noted in FIGURE 6, the scoop tube 170 is slidably received in valve chamber 172. The scoop tube carries a valve element 174. The element 174 is relatively thick.

Three exit ports 176, 178, 180 are provided in the wall chamber 172. Conduits 182, 184, 186 lead from these ports to operate valves as previously described.

In the FIGURE 6 embodiment, liquid under pressure does not flow directly from the scoop tube 170. All of the liquid which enters the scoop tube is discharged through a single conduit 188. Control liquid from a source of liquid under pressure is provided. An inlet port 190 is provided at the forward end of the chamber 172 and an exit port 192 is provided at the rearward end of the chamber 172. Conduits 194, 196 connect the ports 190, 192 to a source 198 of liquid under pressure. As the piston 174 moves from the forward end of the chamber 172 to the rearward end thereof, liquid under pressure enters and fills the chamber through port 190. The ports 176, 178, 180 are sequentially opened and the valves to which the conduits 182, 184, 186 lead are sequentially opened as previously described. Liquid on the reverse side of the piston 174 is forced through the port 192 back to the pressure source 198.

Figure 7:
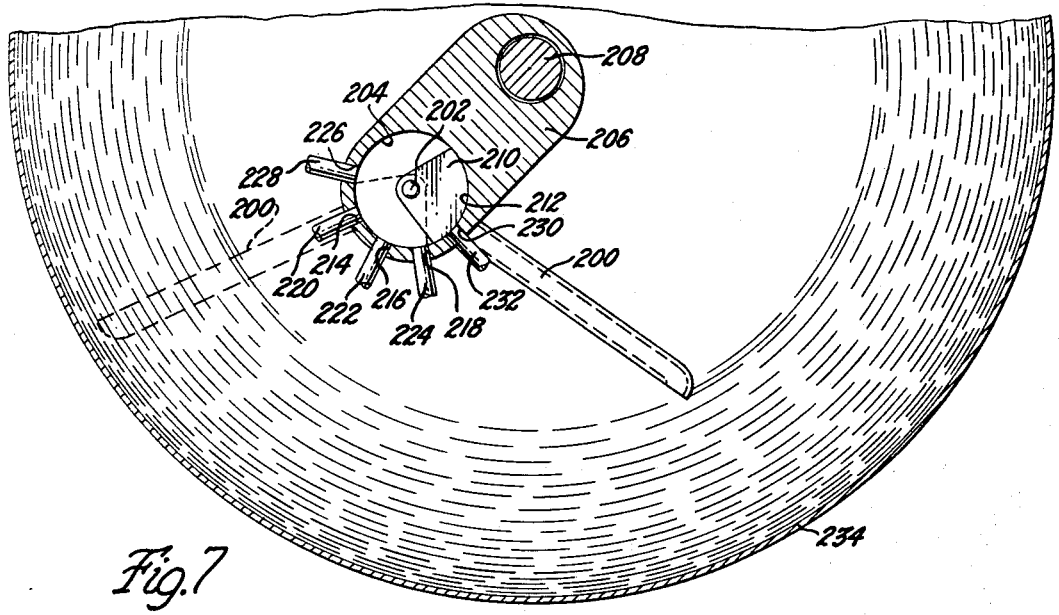
FIGURE 7 is a view in section of a further embodiment of the invention in which a swinging scoop tube is employed.

FIGURE 7 illustrates an embodiment of the invention similar to FIGURE 6 but wherein a rotatable scoop tube rather than a slidable scoop tube is utilized. In FIGURE 7, scoop tube 200 is connected to a shaft 202. The shaft 202 projects into a circular cavity 204 provided in a stationary manifold structure 206. The output shaft 208 of the fluid drive extends through the manifold 206.

A valve element 210 is provided within the cavity 204. The valve element is fixedly mounted on the shaft 20 and turns therewith. The valve element 210 has a generally triangular configuration with a curved surface 212 in sliding contact with the interior surface of the cavity 204.

Three peripherally spaced ports 214, 216, 218 are provided in the wall of the manifold 206 and in communication with the interior of the cavity 204. Each of the ports has a conduit 220, 222, 224 which leads to a valve in the manner described in connection with FIGURES 1–4 for actuation of the valves when the amount of liquid in the working circuit of the fluid drive is decreased.

An inlet port 226 is provided for the injection of liquid under pressure into the cavity 204. The port 226 is provided adjacent one side of the cluster of ports 214, 216, 218. A conduit 228 leads from the port 226 to a source of liquid under pressure. An outlet port 230 is provided on the opposite side of the ports 214, 216, 218. The outlet port 230 has a conduit 232 for discharge of liquid from the cavity 204 back to the source of liquid.

When the scoop tube 200 is pivoted to the dotted line position illustrated in FIGURE 7, the end of the scoop tube is closely adjacent to the surface of the casing 234 and a maximum amount of liquid is present in the working circuit of the fluid drive. In this position, the valve element 210 closes all of the ports 214, 216, 218. It will be noted that the curved surface 212 is sufficient to close all of these ports. When the valve element is in the dotted line position, the inlet port 226 and outlet port 230 are both open. Liquid thus circulates freely through the cavity 204 without having any effect on the fluid drive.

When the scoop tube 200 is pivoted towards the full line position, the ports 214, 216, 218 are sequentially opened. As soon as the port 214 is opened, the outlet port 230 is closed. Liquid injected into the cavity 204 from the inlet port 226 is thus effective through the port 214 to cause opening of the valve connected to this port.

When the scoop tube 200 is pivoted to the point illustrated in full lines illustrated in FIGURE 7, all of the ports 214, 216, 218 are open. In this declutched position, the minimum amount of liquid is in the working circuit of the fluid drive while the maximum amount is present in the casing 234. In such a condition, it is desired to have a maximum flow of liquid through the working circuit of the fluid drive.

Figure 8:
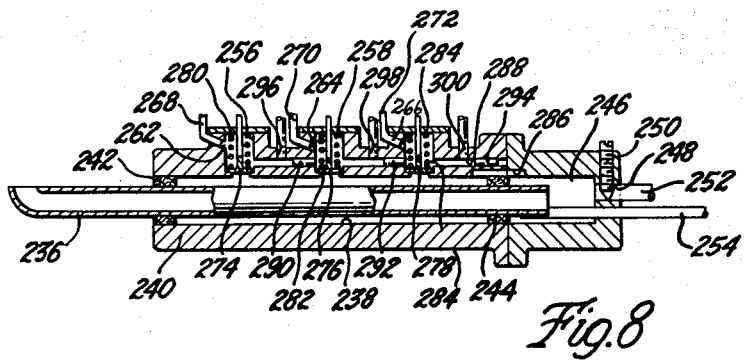
FIGURE 8 is a sectional view of an embodiment of the scoop tube control structure utilizing spring-actuated valves.
Figure 9:
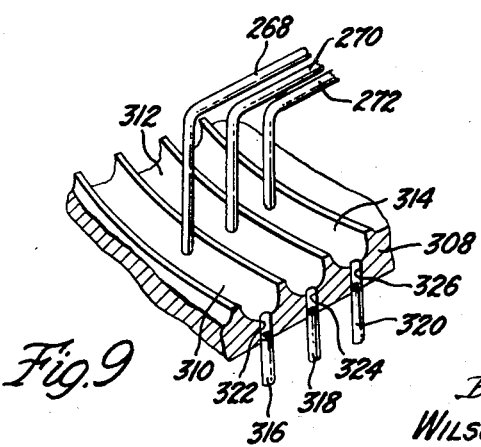
FIGURE 9 is a partial sectional view in perspective of liquid receiving mechanism for use in connection with the FIGURE 8 embodiment.

FIGURES 8 and 9 represent a further embodiment of the invention. In this embodiment, a scoop tube 236 is slidably mounted within a chamber 238 provided in a scoop manifold 240. Sealing bushing elements 242, 244 are provided at each end of the chamber 238. The scoop tube 236 discharges into the chamber portion 246 on the rearward side of seal 244. A port 248 is provided for discharge of liquid from the chamber portion 246. A back pressure regulating valve 250 provides an adjustable restriction in the port 248 to limit the amount of liquid which can flow therethrough and thus permit regulation of the pressure in chamber portion 246. A discharge conduit 252 leads from port 248. An operating rod 254 is provided for positionment of the scoop tube 236.

Three passageways 256, 258, 260 are provided in the manifold 240 in longitudinally spaced apart relationship. Each of the passageways 256, 258, 260 is in communication with the interior of chamber 238. A discharge port 262, 264, 266 is provided for each of the pasageways 256, 258, 260. Each of these ports has a conduit 268, 270, 272 leading to a valve on a fluid coupling for operation of the valve as discussed in connection with embodiment of FIGURES 1–4.

A valve element 274, 276, 278 is provided in each of the passageways 256, 258, 260. A spring 280, 282, 284 is provided for each valve element to normally bias the valve elements to close communication between the chamber 238 and passageways 256, 258, 260.

A passageway 286 is provided in the rearward portion of the manifold 240 for fluid communication between the chambers 238, 246. Liquid under presure in chamber 246 flows into the chamber 238. The pressure of this liquid may be varied by adjustment of the valve 250.

A cored pasageway 288 is provided in the manifold 240. The pasageway 288 extends through each of the passageways 256, 258, 260. A plug 290, 292, 294 is provided to block fluid communication between the passageways. A port 296, 298, 300 is provided in the manifold wall into connection with the passageway 288 adjacent each of the plugs. Each of the ports is provided with a conduit which leads to a source of liquid under pressure. This source may be an external pump or it may be the liquid in chamber 246. Alternately, passageways may lead directly from chamber 238 into passageway 288.

Operation of the FIGURE 8 embodiment may now be understood. When the scoop tube 236 is fully extended to the left as viewed in FIGURE 8, the liquid pressure in chambers 238, 246 is at a maximum. This pressure is sufficient to cause movement of the valve elements 274, 276, 278 to a position above the passageway 288. As a consequence, the passageways 262, 264, 266 are closed and liquid cannot flow therethrough to cause opening of the valves on the fluid drive. This is desired at this time because the fluid drive is operating at maximum capacity and the amount of liquid therein is relatively large and slippage is relatively low so that a high rate of fluid flow through the working circuit is not necessary.

When the scoop tube 236 is moved to the right as viewed in FIGURE 8, the presure in chambers 238 and 246 drops. The valve elements will then move to the closed position illustrated in FIGURE 8 permitting communication between the ports 262, 264, 266 and passageway 288. Liquid will then flow through the conduits 268, 270, 272 to an interiorly grooved ring member 308 and be discharged into the grooves 310, 312, 314 as illustrated in FIGURE 9. Conduits 316, 318, 320 lead from ports 322, 324, 326 which communicate with the grooves. The conduits 316, 318, 320 are, as previously described, connected to valves on the fluid drive and cause these valves to open for increased fluid flow through the working circuit of the fluid coupling. As will be appreciated, the ring 308 rotates with the fluid coupling causing the fluid in the grooves to be thrown by centrifugal force into the ports 322, 324, 326 under a pressure sufficient to open the valves on the fluid coupling.

If desired, the springs 280, 282, 284 may each have a different spring rate so that the passages 256, 258, 260 will be opened sequentially. Alternately, the spring rates may be the same so that these passageways will be opened simultaneously.

Having thus described my invention, I claim:

1. In a fluid coupling comprising rotatable vaned impeller and runner elements defining a working circuit, a scoop chamber reservoir adjacent to the working circuit and rotatable with the impeller, first restricted port means communicating with the working circuit through which port means working liquid flows continuously from the working circuit into the scoop chamber reservoir during operation of the coupling, a movable scoop tube in the scoop chamber reservoir for exhausting working liquid therefrom and thereby varying the degree of filling of the working circuit, means receiving working liquid from the scoop tube and supplying said working liquid continuously to the working circuit during operation of the coupling, the improvement comprising a source of liquid under pressure, second restricted port means communicating with the working circuit, said second port means having first valve means connected to said source, second valve means connected between said source and the first valve means, said scoop tube being operable to open said second valve means upon movement of the scoop tube to a position to decrease the degree of filling of the working circuit and to close said second valve means upon movement of the scoop tube to a position to increase the degree of filling of the working circuit, said first valve means operable to open upon opening of said second valve means to increase the restricted flow of working liquid from said working circuit and operable to close upon closing of said second valve means to decrease the restricted flow of working liquid from said working circuit.

2. A fluid coupling as defined in claim 1 and further characterized in that said first valve means are mounted for rotation with the working circuit, the first valve means having inlet means, a ring member mounted for rotation with the first valve means, said ring member having annular groove means, conduit means extending from said second valve means for injection of liquid therefrom into said annular groove means, and conduit means connecting said annular groove means with the inlet means of the first valve means for flow of said liquid under centrifugal pressure into said first valve means.

3. A fluid coupling as defined in claim 2 and further characterized in that the groove means on said ring member are provided on the interior periphery thereof with the groove means mouth facing radially inwardly.

4. A fluid coupling as defined in claim 3 and further characterized in that said groove means are provided on the side wall of said ring member with the groove means mouth facing radially inwardly.

5. A fluid coupling as defined in claim 1 and further characterized in that said second valve means comprises a chamber, said scoop tube being slidably received in said chamber, a valve element on said scoop tube in sealing contact with the interior walls of said chamber, an inlet to said chamber and an outlet means from said chamber, said valve element being positioned between said inlet and said outlet when the scoop tube is in a position to increase the degree of filling of the working circuit to thereby prevent flow of liquid from the inlet through the outlet of the chamber, said valve element being positioned on the opposite side of said outlet to permit flow from the inlet to the outlet when the scoop tube is positioned to decrease the degree of filling of the working circuit.

6. A fluid coupling as defined in claim 5 and further characterized in that the inlet to the chamber is provided in the scoop tube, the source of liquid under pressure being the liquid flowing through the scoop tube.

7. A fluid coupling as defined in claim 1 and further characterized in that said first valve means comprises a plurality of separate valves, said second valve means including a connection to each of said first valve means, and means in said second valve means to sequentially open each connection of said second valve with said first valve means to thereby sequentially open said first valve means as the scoop tube is moved to a position to decrease the degree of filling of the working circuit.

8. The fluid coupling as defined in claim 1 and further characterized in that said second valve means comprises a chamber, a valve element pivotally mounted in said chamber, said valve element being connected to the scoop tube, said scoop tube being a pivotable member, said valve element being pivoted from a position to close said second valve means upon movement of the scoop tube to a position to increase the degree of filling of the working circuit and pivotable to a position to open said second valve means upon movement of the scoop tube to a position to decrease the filling of the working circuit.

9. A fluid coupling as defined in claim 1 and further characterized in that the second valve means includes spring actuated valve element means, said spring actuated valve element means acting to close said second valve means upon movement of the scoop tube to a position to increase the degree of filling of the working circuit and to open said valve means upon movement of the scoop tube to a position to decrease the degree of filling of the working circuit.

References Cited

UNITED STATES PATENTS

| | | | |
|---|---|---|---|
| 2,718,760 | 9/1955 | Oding | 60—54 |
| 3,147,635 | 9/1964 | Fisher | 60—54 XR |
| 3,232,138 | 2/1966 | Burckhardt | 60—54 XR |
| 3,270,838 | 9/1966 | Schweizer | 60—54 XR |
| 3,302,486 | 2/1967 | Gabriel | 60—54 XR |
| 3,320,748 | 5/1967 | Nelden | 60—54 |

EDGAR W. GEOGHEGAN, *Primary Examiner.*